United States Patent
Miyamura et al.

(10) Patent No.: US 11,437,062 B1
(45) Date of Patent: Sep. 6, 2022

(54) REDUCING TIME TO REPOSITION TAPE TO WRITE INDEX

(71) Applicant: International Business Machines Corporation, Armonk, NY (US)

(72) Inventors: Tsuyoshi Miyamura, Yokohama (JP); Tohru Hasegawa, Tokyo (JP); Noriko Yamamoto, Tokyo (JP); Atsushi Abe, Ebina (JP); Hiroshi Itagaki, Yokohama (JP); Shinsuke Mitsuma, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/409,075

(22) Filed: Aug. 23, 2021

(51) Int. Cl.
| | |
|---|---|
| *G11B 27/10* | (2006.01) |
| *G11B 5/55* | (2006.01) |
| *G11B 5/02* | (2006.01) |
| *G11B 5/008* | (2006.01) |
| *G11B 5/49* | (2006.01) |

(52) U.S. Cl.
CPC ........ *G11B 5/5508* (2013.01); *G11B 5/00813* (2013.01); *G11B 5/02* (2013.01); *G11B 5/49* (2013.01)

(58) Field of Classification Search
None
See application file for complete search history.

(56) References Cited

U.S. PATENT DOCUMENTS

| | | | | |
|---|---|---|---|---|
| 4,891,784 | A * | 1/1990 | Kato | G06F 3/0601 |
| | | | | 709/236 |
| 5,335,119 | A * | 8/1994 | Shih | G11B 27/328 |
| 5,384,673 | A * | 1/1995 | Yoshioka | G06F 3/0601 |
| 6,189,824 | B1 * | 2/2001 | Stricker | G11B 15/6656 |
| | | | | 360/95 |
| 10,497,391 | B1 * | 12/2019 | Miyamura | G11B 5/00817 |
| 10,902,872 | B1 | 1/2021 | Hasegawa et al. | |
| 2002/0012525 | A1 * | 1/2002 | Yuen | G11B 15/087 |
| 2002/0095537 | A1 * | 7/2002 | Slater | G06F 3/0613 |
| | | | | 711/111 |
| 2002/0118481 | A1 * | 8/2002 | Ingram | G11B 27/11 |
| 2003/0194200 | A1 * | 10/2003 | Yuen | H04N 5/782 |
| 2010/0080393 | A1 * | 4/2010 | Feather | H04L 9/0827 |
| | | | | 380/278 |
| 2014/0025911 | A1 * | 1/2014 | Sims | G11B 20/1803 |
| | | | | 711/162 |
| 2016/0098192 | A1 * | 4/2016 | Ochi | G06F 3/0656 |
| | | | | 711/111 |

(Continued)

FOREIGN PATENT DOCUMENTS

| | | |
|---|---|---|
| JP | 2014081988 A | 5/2014 |
| JP | 2015204125 A | 11/2015 |
| JP | 2015215788 A | 12/2015 |

*Primary Examiner* — Peter Vincent Agustin
(74) *Attorney, Agent, or Firm* — James L. Olsen (57) ABSTRACT

Aspects of the present disclosure relate to a method for reducing repositioning time within tape systems. A request to reposition to a target file within a tape medium can be received. A determination can be made that a previous command issued to the tape system was a write and that an index corresponding to the write has not been written. In response to determining that the previous command was the write and that the index corresponding to the write has not been written, a first file mark, the index after the first file mark, and a second file mark after the index can be written.

20 Claims, 7 Drawing Sheets

(56) References Cited

U.S. PATENT DOCUMENTS

| | | | |
|---|---|---|---|
| 2018/0341665 A1* | 11/2018 | Basham | G06F 16/22 |
| 2019/0227992 A1 | 7/2019 | Abe et al. | |
| 2019/0371364 A1 | 12/2019 | Hasegawa et al. | |
| 2020/0142593 A1 | 5/2020 | Abe et al. | |

* cited by examiner

REDUCING TIME TO REPOSITION TAPE TO WRITE INDEX

BACKGROUND

The present disclosure relates generally to the field of storage systems in computing environments, and more particularly, to processing data in a tape file system.

Magnetic tape systems store digital information on a magnetic tape. The magnetic tape can include a ferromagnetic material that, when exposed to a magnetic field, is magnetized. Tape systems use "tape heads" to apply magnetic flux to the ferromagnetic material of the tape medium to write data to the tape. Based on the stored magnetic imprint on the tape, binary data can be generated and read from the tape.

SUMMARY

Aspects of the present disclosure relate to reducing repositioning time within tape systems. A request to reposition to a target file within a tape medium can be received. A determination can be made that a previous command issued to the tape system was a write and that an index corresponding to the write has not been written. In response to determining that the previous command was the write and that the index corresponding to the write has not been written, a first file mark, the index after the first file mark, and a second file mark after the index can be written.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of storage systems in computing environments, and more particularly, to processing data in a tape file system. While the present disclosure is not necessarily limited to such applications, various aspects of the disclosure may be appreciated through a discussion of various examples using this context.

The Linear Tape File System (LTFS) is a file system that allows access to files stored on a tape medium in a similar fashion to files stored on a disk (e.g., Hard Disk Drive (HDD)) or flash memory (e.g., a NAND Storage USB Memory Device). The LTFS enables data access (e.g., read/write access) to a file stored on the tape medium directly from a file-based application without using a dedicated application for the tape drive. The LTFS is formatted in accordance with an open specification defined by the International Organization for Standardization (ISO). The ISO-defined LTFS format specification includes two partitions: an index partition (IP) and a data partition (DP). The index partition records indices (e.g., metadata or index information) for respective files, and the data partition records the files as well as indices.

The index partition is updated with the most recent index information to reduce the time required to read index information when the tape medium is mounted into a tape drive. Upon remounting the tape medium, the index information is read from the index partition (e.g., located at the beginning of the tape medium), and the most recent data written to the tape medium can be located on the tape medium. In contrast, the index information can also be read directly from the data partition. However, the mounting process can take more time, as the index stored on the data partition is located at the end of the data portion of the tape.

Figure 1:
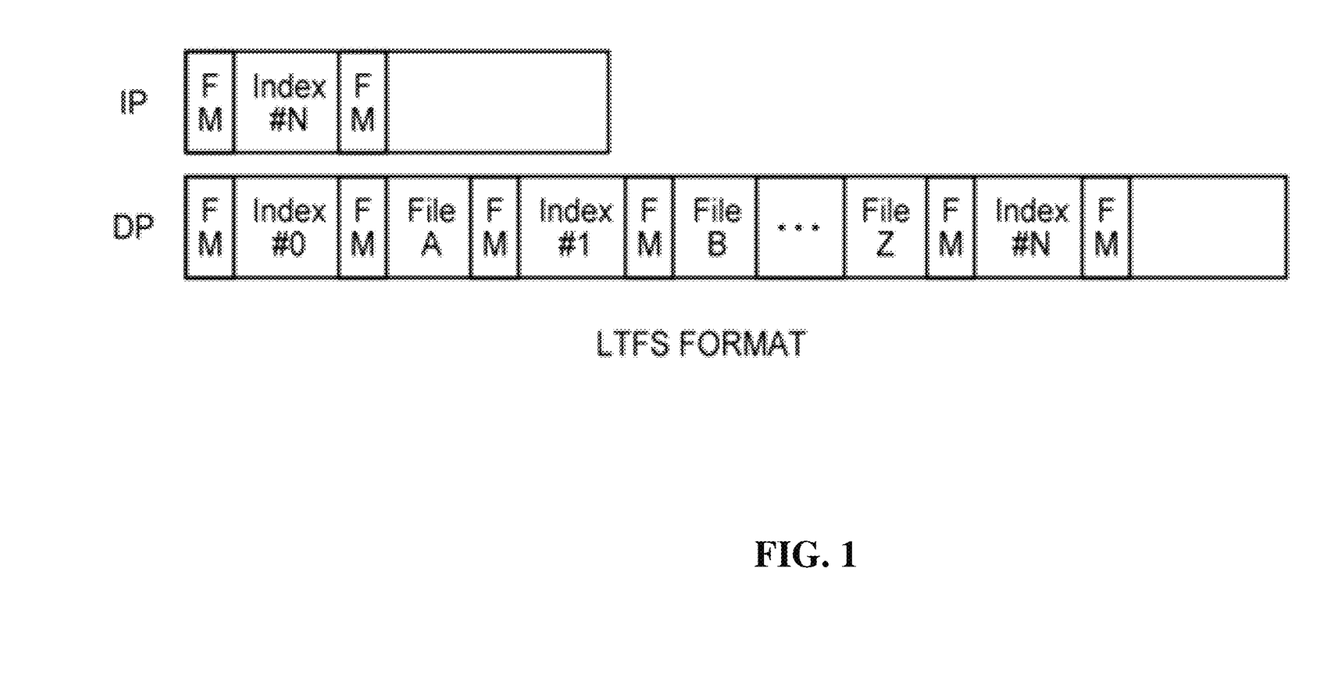
FIG. 1 is a diagram illustrating an example tape medium format including an index partition (IP) and a data partition (DP), in accordance with embodiments of the present disclosure.

Referring now to the figures, FIG. 1 is a diagram illustrating an example tape medium format including an index partition (IP) and a data partition (DP), in accordance with embodiments of the present disclosure. As illustrated in FIG. 1, the DP stores File A, File B . . . through File Z. Generally, the DP stores file bodies and a history of index information. Upon writing index data (e.g., Index #0, Index #1 . . . through Index #N) to the DP, file marks (FMs) can be written to the DP immediately before and after the writing of each index. The FM can enable convenient location of index information recorded on the tape medium. Though the information in the DP is sufficient in terms of the amount of information to resume reading/writing data, the latest index information is recorded in the IP to reduce the time required to read index information when the tape medium is inserted into the tape drive.

The indices (e.g., Index #0, Index #1 . . . through Index #N) include information regarding the current volume of the data written to the tape medium. The indices can be used to verify the consistency of the tape medium volume. The index data can be stored in XML (Extensible Markup Language) format. Each index can contain a generation number, self-pointer, and back-pointer. The generation number records the age of each respective index relative to other indices in the volume. Accordingly, the index with the highest generation number represents the current state of the entire volume on the tape medium. The self-pointer includes data regarding the block position of each respective index in addition to the volume to which each index belongs. The back-pointer includes information regarding the position of the preceding index in the data partition. Accordingly, the information stored in each index can be used to locate indices, files, and blocks of data recorded on the tape medium.

In some embodiments, the indices can be written periodically (e.g., every 5 minutes). In some embodiments, the indices can be written each file close (e.g., Index #1 and Index #N are written in response to closing Files A and Z, respectively). In some embodiments, the indices can be written in response to the tape medium being unmounted (e.g., each index depicted in FIG. 1 is written in response to an unmount operation). However, in some embodiments, combinations of the conventional index write conditions can be implemented. For example, Index #0 can be written based on a periodic index write, Index #1 can be written based on File A being closed, and Index #N can be written in response to an unmount operation. In embodiments, the interval for writing indices can be specified by a linear tape file system (LTFS) command starting option.

The most recent index, Index #N, is stored in the IP of the tape medium such that upon remounting the tape, Index #N can be quickly located within the IP. This improves the remounting process (e.g., the tape being reeled to the latest position in the DP) within the tape system. In some embodiments, each index is stored in the IP, and additional indices are appended onto the end of the IP. In some embodiments, the indices stored in the index partition can be rewritten with the most recent index information.

In embodiments, index size can become large as the number of files increases. Thus, in embodiments, indices may only record differences since previous indices to reduce the size of indices written to the tape (e.g., a latter index may only record differences between the latter index and a preceding index). Such an index is referred to as an "incremental index." In embodiments, however, if many incremental indices are written, the time required to restore the original index increases. As such, in embodiments, full indices can be resumed to be written after writing incremental indices a certain number of times (e.g., after a threshold number of incremental indices have been written).

Reference will now be made to current timing issues associated with repositioning tape media tape systems. When a file read request is received by the LTFS, the record position corresponding to the file to be read is acquired from meta-information stored within an index. The read command is then issued to the tape drive, and the record position of the tape medium is moved to the record position specified within the meta information of the index by the tape drive (e.g., a motor of the tape drive reels the tape to the record position of interest).

In this instance, if a file write has completed and an index corresponding to the updated write has not been stored yet, the tape drive repositions the tape medium to the record of interest. This is because the read request is the highest priority request within the LTFS (e.g., and the record must be read as soon as possible). Thereafter, to resume writing the index corresponding to the updated write, the tape drive is required to reposition the tape medium to the end of data (EOD) position on the tape medium and write the index (e.g., which may occur 5 minutes after writing the previous index).

If an unmount operation is received after the file read request is completed and the tape position is repositioned to the record corresponding to the read request, if an index has not yet been stored, the tape drive is required to position the tape back to the end of data portion and then rewind the tape back to the beginning of the tape to perform the unmount. This adds additional repositioning time for the unmount command.

Thus, aspects of the present disclosure are directed to methods of improving repositioning within tape systems. A request to reposition to a target file within a tape medium can be received. A determination can be made that a previous command issued to the tape system was a write and that an index corresponding to the write has not been written. In response to determining that the previous command was the write and that the index corresponding to the write has not been written, a first file mark, the index after the first file mark, and a second file mark after the index can be written.

Figure 2:
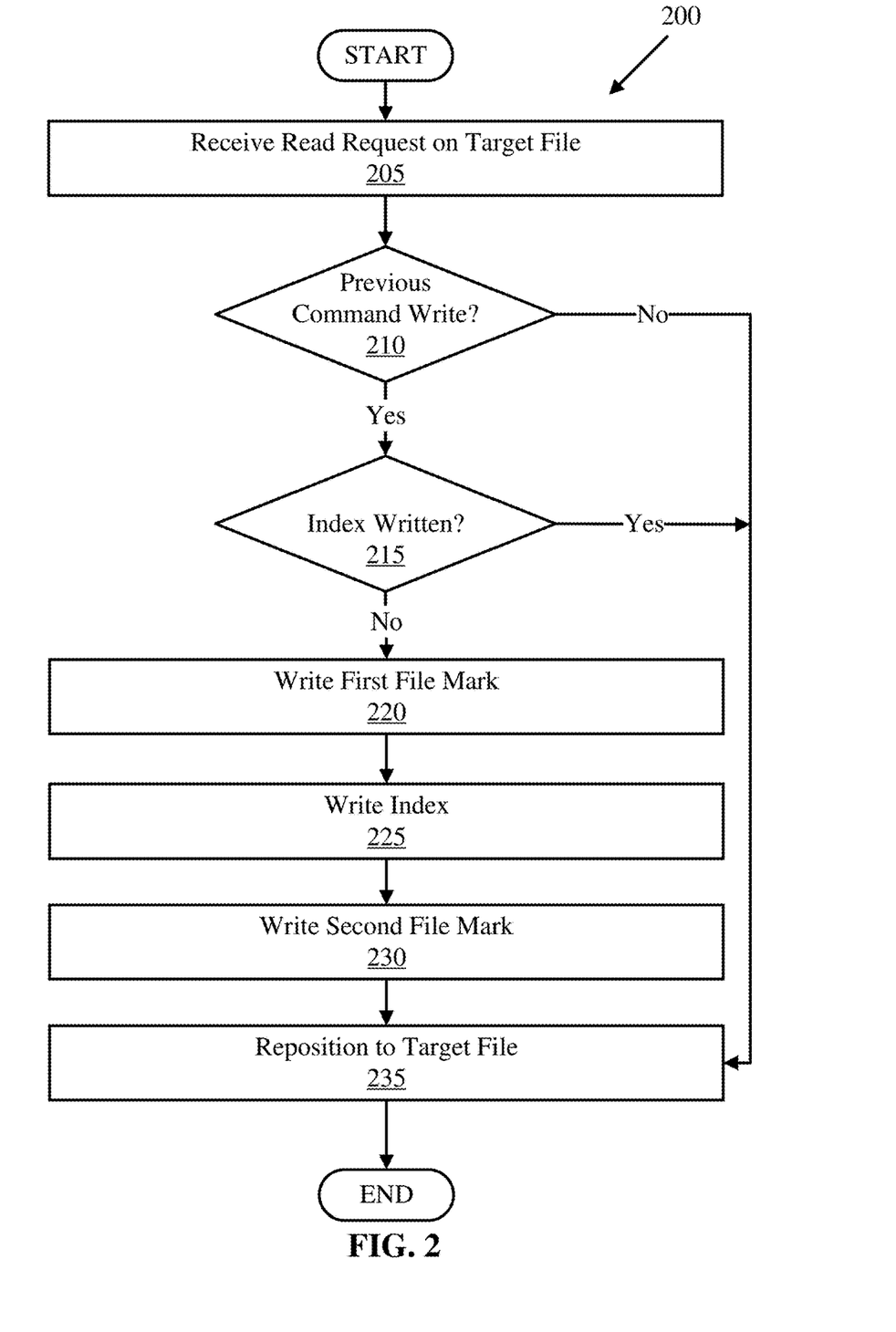
FIG. 2 is a diagram illustrating an example method for writing an index in response to receiving a request to reposition to a target file, in accordance with embodiments of the present disclosure.

Referring now to FIG. 2, shown is an example method 200 to reduce repositioning time within a tape system, in accordance with embodiments of the present disclosure.

Method 200 initiates at operation 205, where a read request on a target file is received. The read request may specify one or more records of interest of a target file that has already been written to a tape medium. The read request may be received at any suitable time (e.g., while a current write or read is already occurring).

A determination is then made whether a previous command prior to receiving the read request was a write. This is illustrated at operation 210. If the previous command prior to receiving the read request is not a write (e.g., another read request), then the tape medium can be repositioned (e.g., by a tape drive) to the target file for which the read request is directed to at operation 235.

If a determination is made that the previous command is a write, then a determination is made whether an index corresponding to the updated data associated with the write has been written. This is illustrated at operation 215. If an index associated with the updated data written to the tape medium as a part of the write was already written, then the tape medium can be repositioned to the target file at operation 235.

If an index associated with the updated data written to the tape medium as a part of the write was not written, then a first file mark is written to the tape medium at the location of the current write. This is illustrated at operation 220. Thereafter, an index corresponding to the updated data associated with the write is written to the tape medium. This is illustrated at operation 230. Thereafter, a second file mark is written after the index. This is illustrated at operation 230. The tape medium is then repositioned to the target file associated with the read request received at operation 205. This is illustrated at operation 235.

By determining whether a previous write command has been issued and determining whether an index corresponding to the write has been written upon receiving a read request for a target file, a determination can be made whether to write the updated index and corresponding file marks before executing the read. This can save repositioning time. For example, if an unmount operation is received after the read request and an index has not been stored, then the tape medium would be required to be repositioned to the end of data portion such that the index can be updated, then the tape would be wound back to the beginning of the tape drive as a part of the unmount operation. Conversely, if an index is written to the tape medium prior to executing the read request, the tape can be rewound to the beginning of the tape directly after the read request, saving time associated with the unmount operation.

The aforementioned operations can be completed in any order and are not limited to those described. Additionally, some, all, or none of the aforementioned operations can be completed, while still remaining within the spirit and scope of the present disclosure.

Figure 3A:
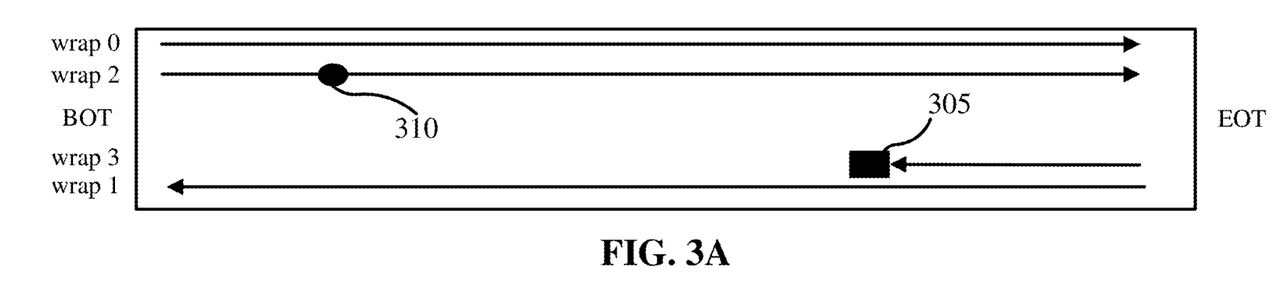
FIG. 3A depicts a diagram of a tape medium including a current write location and a read request position, in accordance with embodiments of the present disclosure.
Figure 3B:
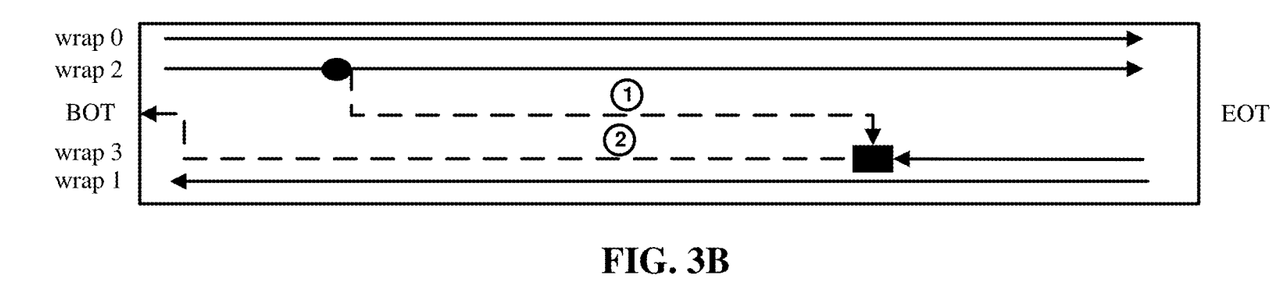
FIG. 3B depicts a diagram of repositioning of a tape medium in response to an unmount operation when an index has not been written before a read reposition is issued, in accordance with embodiments of the present disclosure.
Figure 3C:
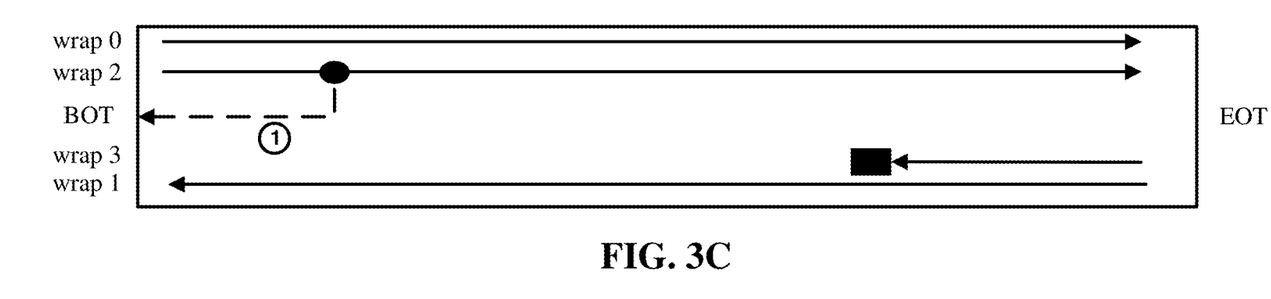
FIG. 3C depicts a diagram of repositioning of a tape medium in response to an unmount operation when an index has been written before a read reposition is issued, in accordance with embodiments of the present disclosure.

Referring now to FIGS. 3A-3C, shown are diagrams depicting repositioning of a tape medium after an unmount request, in accordance with embodiments of the present disclosure. FIG. 3A depicts a diagram of a tape medium having a current write position 305 and a read position 310 (e.g., corresponding to a read request, such as at operation 205 of FIG. 2). FIG. 3B depicts a diagram of repositioning the tape medium from the read position 310 in response to an unmount request in an instance where an index has not been written at the write position 305 after repositioning to the read position 310. FIG. 3C depicts a diagram of repositioning the tape medium from the read position 310 in response to an unmount request in an instance where an index has been written after the write position 305.

As shown in FIG. 3A, the tape is divided into a plurality of wraps. The portion of FIG. 3A depicts a data band of a tape medium, which may include more or less wraps than shown in FIG. 3A. As such, the beginning of data portion of the tape starts at the left side of wrap 0, where the end of data portion of the tape ends at the end of wrap 3 (e.g., at write position 305). Upon writing data (e.g., a file comprising one or more records) at the write position 305, a read request is received for a target record at read position 310.

Referring now to FIG. 3B, in this example, the index (e.g., a differential index) is not written after the data update at the write position 305. The tape is repositioned to the read position 310 after the write occurs. Thereafter, an unmount operation is received. To unmount the tape, the tape drive repositions the tape medium first (1) from the read position to the write position 305 such than an index can be written at the write position. Thereafter, at (2), the tape is rewound to the beginning of the tape (e.g., from wrap 3 to the beginning of wrap 0), thereby completing the unmount operation.

Referring now to FIG. 3C, in this example, the index is written after the data update at the write position 305. The tape is repositioned to the read position 310 after the write (e.g., of the data and the index) occurs. Thereafter, the unmount operation is received. In this instance, to unmount the tape, the tape drive repositions the tape medium directly from the read position to the beginning of the tape (e.g., from wrap 2 to wrap 0) at (1), thereby completing the unmount operation.

Assuming that the tape medium length is approximately 1,000 meters and that repositioning to a target record moves at a speed of approximately 10 m/s, then to get from one end of the tape to the other, it would take roughly 100 seconds. It takes about 33 seconds on average to move from any position on the tape medium to any other position on the tape medium. In addition, it takes about 50 seconds on average to move from an arbitrary position to the edge of the tape.

Referring to FIG. 3B, assuming the length of the tape medium is L and the speed during movement is V, the movement between any two arbitrary positions (e.g., from the read position 310 to the write position 305) on the tape medium can be denoted by L/3(V) on average. To write a new file (e.g., an index file) at the end, repositioning and writing needs to be performed, which takes about 10 seconds. Subsequent movement to the beginning of the tape, which is movement from an arbitrary position (e.g., the write position 305) to the beginning of the tape position, takes about L/2(V) on average. Thus, total processing time is 5 L/(6V)+10 seconds. Assuming the tape length is 1,000 meters and the running speed for repositioning is 10 m/s, it takes about 93 seconds on average to perform an unmount operation in the instance in FIG. 3B (e.g., from the read position 310 to the write position 305 at (1), then from the write position 305 to the BOT at (2)).

Referring now to FIG. 3C, movement from an arbitrary position on the tape medium (e.g., the write position 310) to the BOT takes L/2(V) on average. Similarly, assuming that the tape length is 1000 m and the running speed for repositioning is 10 m/s, it takes about 50 seconds on average to perform the unmount operation in the instance in FIG. 3C (e.g., from the read position 310 directly to the BOT at (1)).

As such, repositioning associated with FIG. 3C saves about 43 seconds as compared to repositioning in FIG. 3B. Accordingly, by writing an index prior to executing the read repositioning, significant time savings can be realized if an unmount operation is issued after the read positioning occurs.

Figure 4A:
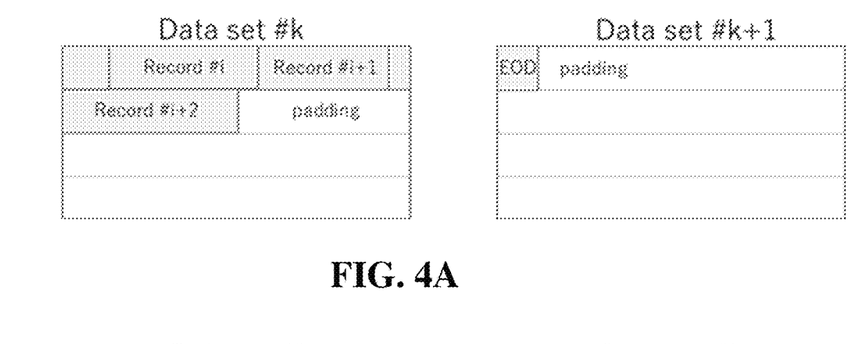
FIGS. 4A, 4B, and 4C depict data sets of a memory buffer that can be flushed to a tape medium, in accordance with embodiments of the present disclosure.
Figure 4B:
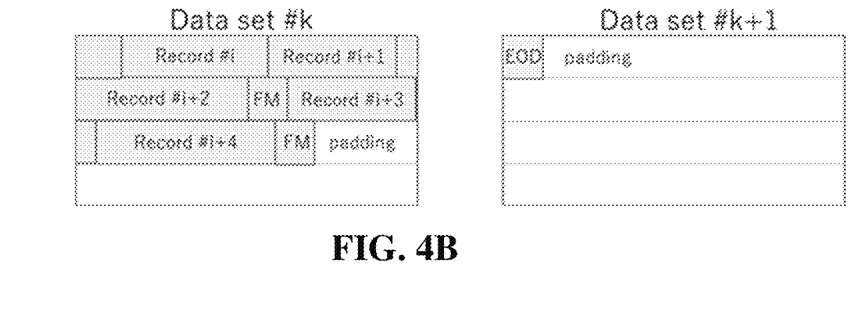
Figure 4C:
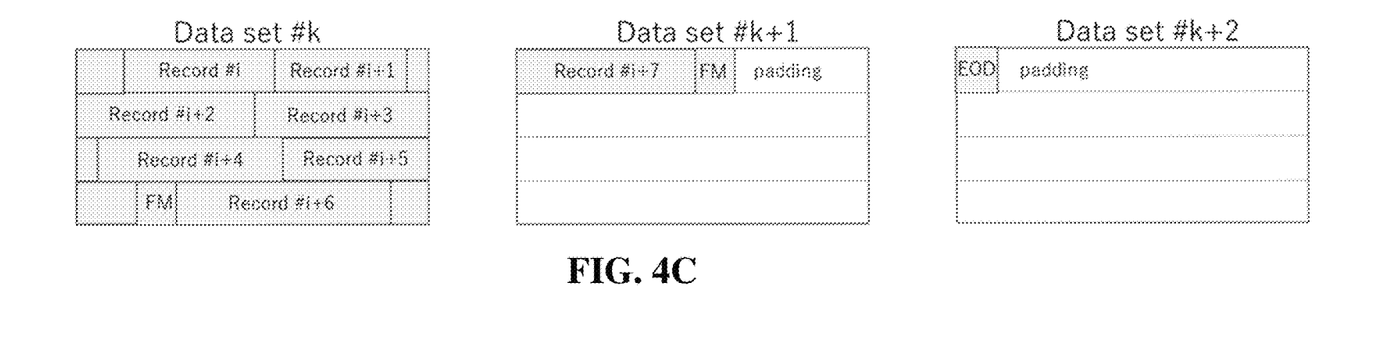

Referring now to FIGS. 4A, 4B, and 4C, shown are records written to data sets of a buffer memory (e.g., a memory configured to store data sets including records to be written to the tape medium) which can be flushed (e.g., transferred) onto a tape medium, in accordance with embodiments of the present disclosure.

As shown in FIG. 4A, records #i, #i+1, and #i+2 originating from a host are compressed by the tape drive and recorded in the buffer memory. Records are usually written to the tape medium (e.g., transferred from the buffer memory to the tape medium) once the dataset becomes full. In this example, the data set #k still has space, and therefore these records are held in the buffer memory instead of being written directly to the tape medium. In this example, when a command to move to a target file (e.g., a read request reposition) is issued, an area after record #i+2 in data set #k is filled with meaningless data (e.g., padding), thus filling the dataset, and then data set #k is written to the tape.

As an indication that the data set #k is the last written effective data, an indicator called end of data (EOD) is recorded at the beginning of the next data set #k+1, which is then subjected to padding to fill the subsequent area without recording any other data, and the data set #k+1 is then written to the tape medium. FIG. 4A illustrates data sets written to a buffer memory that are transferred to a tape medium before repositioning to a target file occurs, without writing an index.

FIG. 4B shows an example where an index is written to the data set #k prior to repositioning to the target file (e.g., in accordance with method 200 of FIG. 2). As shown in FIG. 4B, records #i+3 and #i+4 are the index records written to the data set of the memory buffer, preceded by and followed by file marks (FMs). Padding is then added to the end of the data set #k. An EOD indicator and padding are then written to the next data set #k+1, and the data sets are transferred onto the tape medium. By writing the records #i+3 and #i+4 prior to repositioning to the read request, time savings associated with repositioning (e.g., of an unmount operation) discussed with reference to FIGS. 2-3C can be realized.

FIG. 4C shows an example where an index is written to a buffer memory prior to repositioning to a target file position, where the index spans from dataset #k to data set #k+1. As shown in FIG. 4C, the data set #k contains more data than those discussed in FIGS. 4A-4B. Thus, in order to write the records #i+6 and #i+7 corresponding to the index, the index is required to be written across data sets #k and #k+1. Padding is then added to the data set #k+1 and an EOD indicator and padding are added to the next data set #k+2. Though writing an index across multiple data sets takes slightly more time (e.g., 25 ms), significant time savings associated with repositioning as discussed in FIGS. 2-3C are realized.

Figure 5:
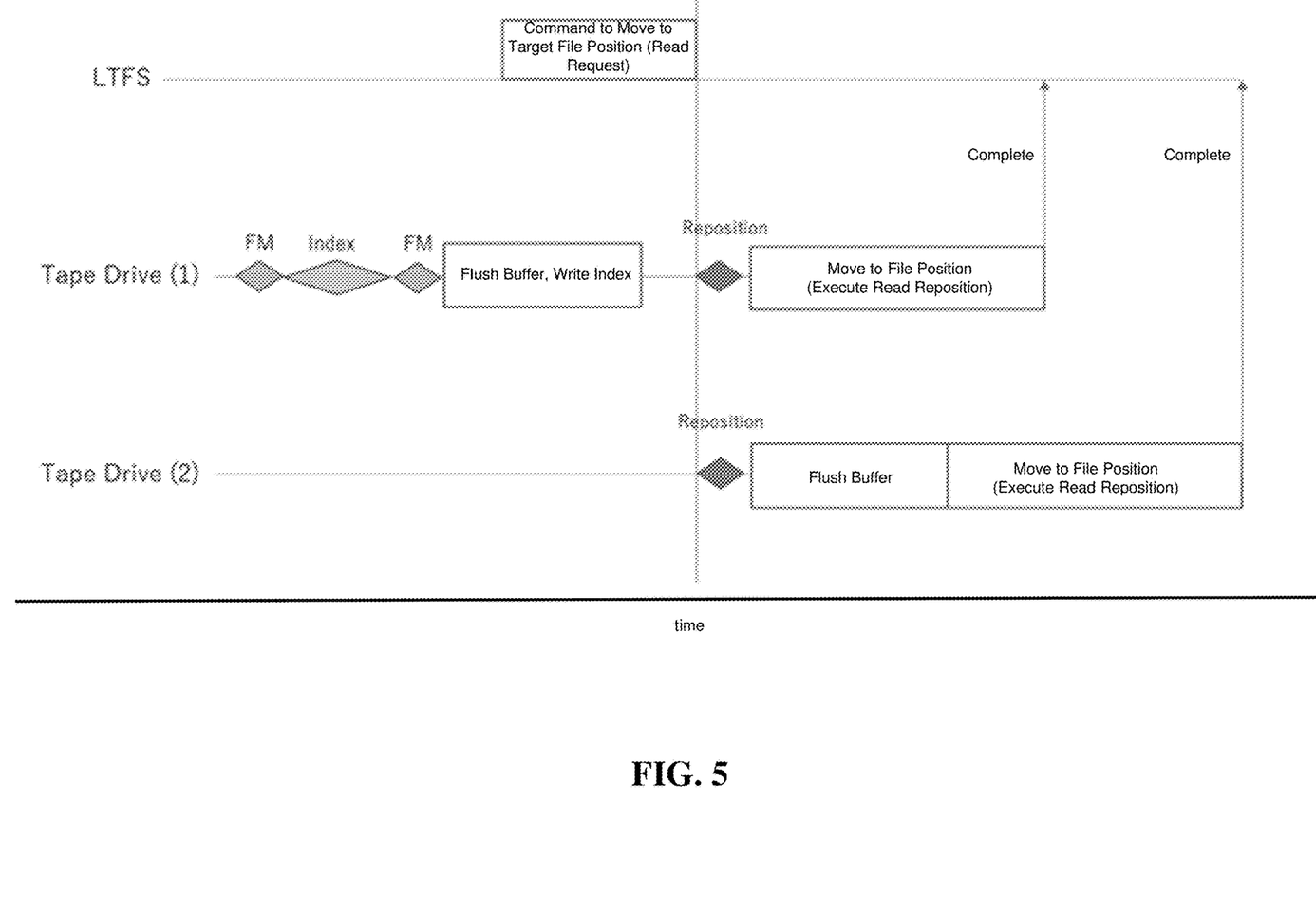
FIG. 5 depicts operations that occur in response to a command to move to a target file position in a first example and in a second example, in accordance with embodiments of the present disclosure.

Referring now to FIG. 5 shown is a diagram illustrating an order of operations that are completed over a time span in response to response to receiving a command to move to a target file position (e.g., a read request) from a host of a linear tape file system (LTFS), in accordance with embodiments of the present disclosure.

As shown in the example depicted in Tape Drive (1) of FIG. 5, a first file mark, an index, and a second file mark are written to a memory buffer prior to being flushed onto a tape medium. Thereafter, the command to reposition to a target file position (e.g., a read request) is received. Thereafter, repositioning occurs to move to the file position associated with the read request.

As shown in the example depicted in Tape Drive (2) of FIG. 5, no index is written to the buffer memory prior to being flushed to the tape medium. The buffer containing any updated data within data sets is then flushed onto the tape medium after repositioning occurs in response to receiving the command to move to the target file position. Thereafter, the tape medium is repositioned according to the read request, which takes more time than as shown in Tape Drive (1), where the index is written.

Figure 6:
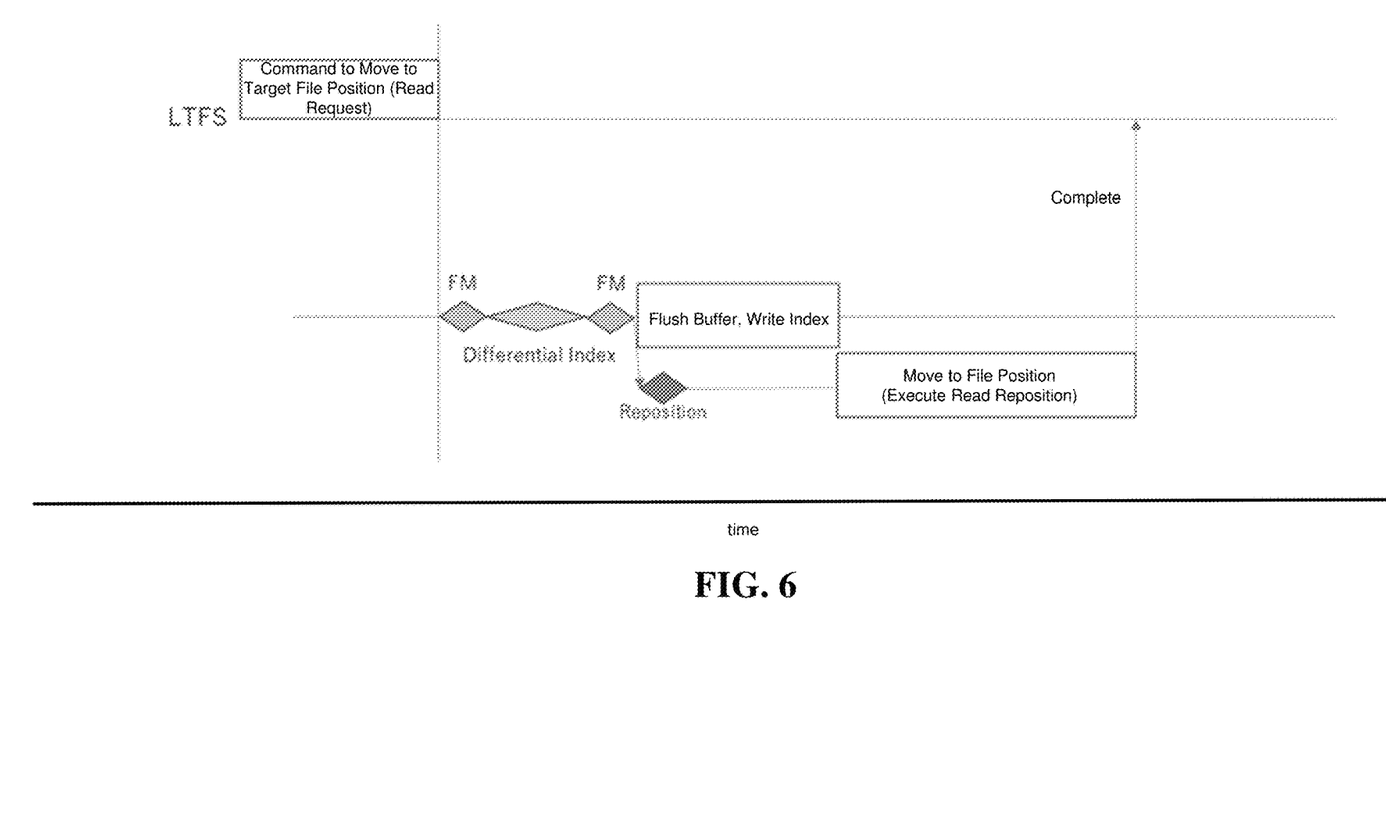
FIG. 6 depicts operations that occur in response to a command to move to a target file position which includes writing an index prior to repositioning to a read position, in accordance with embodiments of the present disclosure.

Referring now to FIG. 6, shown is a diagram illustrating an order of operations that are completed over a time span in response to response to receiving a command to move to a target file position (e.g., a read request) from a host of a linear tape file system (LTFS), in accordance with embodiments of the present disclosure.

As shown in FIG. 6, upon receiving a command to move to a target file position (e.g., a read request), a first file mark is written, a differential index (e.g., an index storing only the differences between the updated write and a preceding index) is written, and a second file mark is written immediately after the differential index (e.g., in an immediate mode) to a buffer memory portion. Thereafter, the buffer memory is flushed to the tape medium (e.g., the index is written to the tape medium). Thereafter, repositioning occurs to move to the file position associated with the read position (e.g., per method 200 of FIG. 2). Repositioning of the tape is then complete. As compared to Tape Drive (2) of FIG. 5, more time is required to write two FMs and a differential index (e.g., of a single data set). However, if the data set is 10 MB and is written at 400 MB/sec, there will only be an additional 25 msec of delay. This is small in comparison to the time savings associated with an unmount operation highlighted in FIG. 3C.

Figure 7:
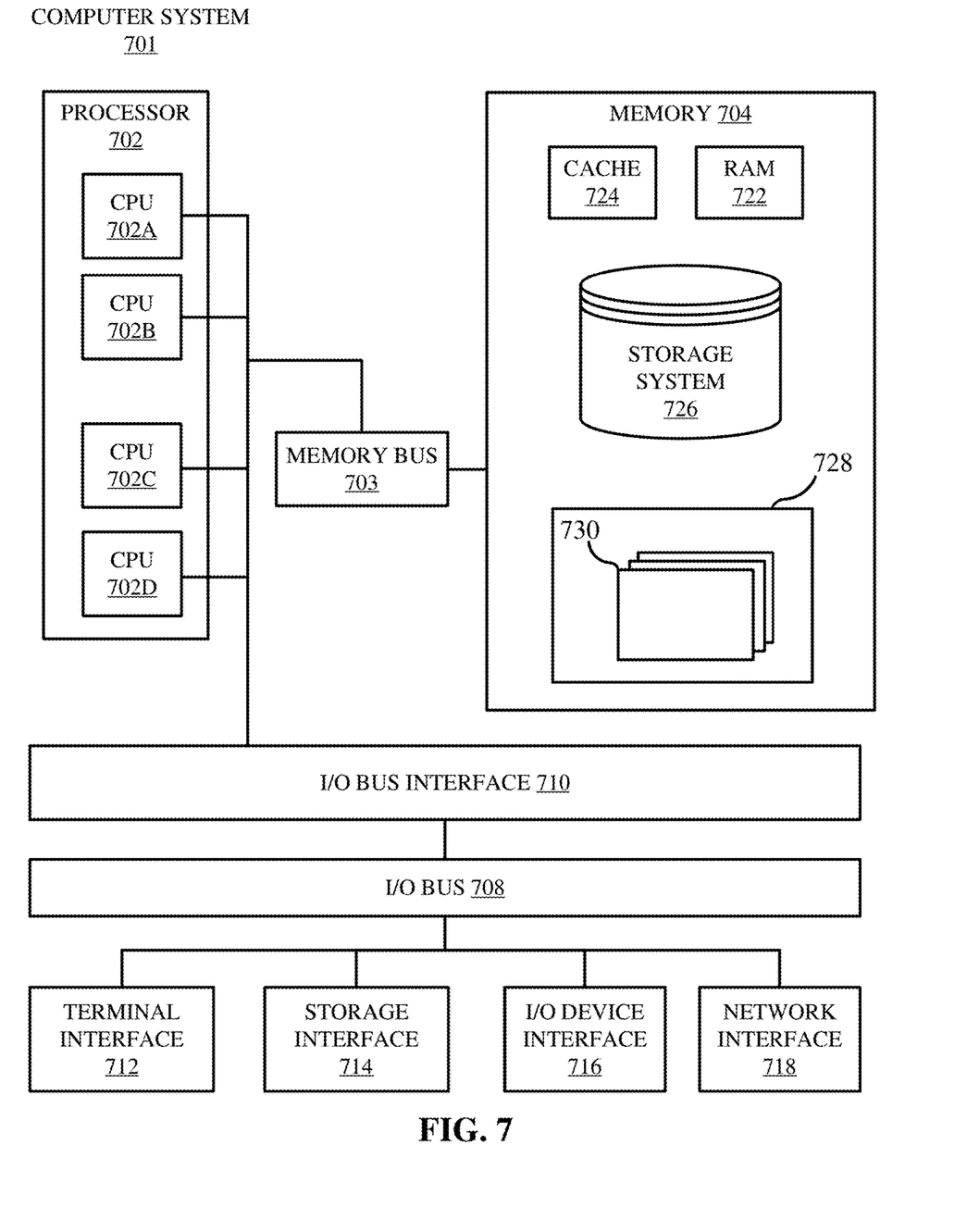
FIG. 7 is a high-level block diagram illustrating an example computer system that can be used in implementing one or more of the methods, tools, and modules, and any related functions, described herein, in accordance with embodiments of the present disclosure.

Referring now to FIG. 7, shown is a high-level block diagram of an example computer system 701 (e.g., a computer system communicatively coupled to the linear tape file system (LTFS)) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 701 can comprise one or more CPUs 702, a memory subsystem 704, a terminal interface 712, a storage interface 716, an I/O (Input/Output) device interface 714, and a network interface 718, all of which can be communicatively coupled, directly or indirectly, for inter-component communication via a memory bus 703, an I/O bus 708, and an I/O bus interface unit 710.

The computer system 701 can contain one or more general-purpose programmable central processing units (CPUs) 702A, 702B, 702C, and 702D, herein generically referred to as the CPU 702. In some embodiments, the computer system 701 can contain multiple processors typical of a relatively large system; however, in other embodiments the computer system 701 can alternatively be a single CPU system. Each CPU 702 can execute instructions stored in the memory subsystem 704 and can include one or more levels of on-board cache.

System memory 704 can include computer system readable media in the form of volatile memory, such as random access memory (RAM) 722 or cache memory 724. Computer system 701 can further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. In embodiments, memory 704 can include a magnetic tape system. For example, the computer system 701 may be communicatively coupled to a linear tape file system (LTFS). Memory devices can be connected to memory bus 703 by one or more data media interfaces. The memory 704 can include at least one program product having a set (e.g., at least one) of program modules that are configured to carry out the functions of various embodiments.

One or more programs/utilities 728, each having at least one set of program modules 730 can be stored in memory 704. The programs/utilities 728 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 728 and/or program modules 730 generally perform the functions or methodologies of various embodiments.

In some embodiments, the program modules 730 of the computer system 701 can include an index write timing module. The index write timing module can include a data store for storing index write timing data. The index write timing data can specify index write timing rules based on file metadata attributes. In embodiments, the index write timing module is configured to determine the timing to write indices to a tape medium based on file metadata. For example, the index write timing module can analyze (e.g., parse) metadata for a file currently being written, and determine whether an index write is permitted while the file is open or whether an index write is required upon closing the file based on the index write timing data (e.g., by comparing the parsed metadata to the index write timing data).

Although the memory bus 703 is shown in FIG. 7 as a single bus structure providing a direct communication path among the CPUs 702, the memory subsystem 704, and the I/O bus interface 710, the memory bus 703 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 can, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices can be connected directly to one or more system I/O buses.

In some embodiments, the computer system 701 can be a multi-user mainframe computer system, a single-user system, or a server computer or similar device that has little or no direct user interface, but receives requests from other computer systems (clients). Further, in some embodiments, the computer system 701 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components can have greater or lesser complexity than as represented in FIG. 7, components other than or in addition to those shown in FIG. 7 can be present, and the number, type, and configuration of such components can vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for reducing repositioning time within a tape system comprising:
   receiving a request to reposition to a target file within a tape medium;
   determining that a previous command issued to the tape system was a write and that an index corresponding to the write has not been written; and
   writing, in response to determining that the previous command was the write and that the index corresponding to the write has not been written, a first file mark, the index after the first file mark, and a second file mark after the index.

2. The method of claim 1, wherein the first file mark, the index after the first file mark, and the second file mark after the index are first written to a buffer memory and are thereafter flushed to the tape medium.

3. The method of claim 2, further comprising:
   issuing, upon writing the first file mark, the index after the first file mark, and the second file mark after the index, the request to reposition to the target file within the tape medium.

4. The method of claim 3, further comprising:
   receiving a command to unmount the tape medium; and
   repositioning directly to a beginning of the tape medium such that an unmount operation can be performed without repositioning to a write location of the index on the tape medium.

5. The method of claim 1, wherein the index is written as at least two records across a first data set and a second data set of a buffer memory, wherein at least one of the at least two records is located on the first data set and wherein at least another one of the at least two records is located on the second data set, and wherein the buffer memory is flushed to the tape medium.

6. The method of claim 1, wherein the index is written as at least one record to a data set of a buffer memory, wherein the buffer memory is flushed to the tape medium.

7. The method of claim 1, wherein the index is an incremental index only storing differences between updated write information on the tape medium and a previous index.

8. A system comprising:
a tape system having a tape medium;
one or more processors; and
one or more computer-readable storage media collectively storing program instructions which, when executed by the one or more processors, are configured to cause the one or more processors to perform a method for reducing repositioning time within the tape system, the method comprising:
receiving a request to reposition to a target file within the tape medium;
determining that a previous command issued to the tape system was a write and that an index corresponding to the write has not been written;
writing, in response to determining that the previous command was the write and that the index corresponding to the write has not been written, a first file mark, the index after the first file mark, and a second file mark after the index.

9. The system of claim 8, wherein the first file mark, the index after the first file mark, and the second file mark after the index are first written to a buffer memory and are thereafter flushed to the tape medium.

10. The system of claim 9, wherein the method performed by the one or more processors further comprises:
issuing, upon writing the first file mark, the index after the first file mark, and the second file mark after the index, the request to reposition to the target file within the tape medium.

11. The system of claim 10, wherein the method performed by the one or more processors further comprises:
receiving a command to unmount the tape medium; and
repositioning directly to a beginning of the tape medium such that an unmount operation can be performed without repositioning to a write location of the index on the tape medium.

12. The system of claim 8, wherein the index is written as at least two records across a first data set and a second data set of a buffer memory, wherein at least one of the at least two records is located on the first data set and wherein at least another one of the at least two records is located on the second data set, and wherein the buffer memory is flushed to the tape medium.

13. The system of claim 8, wherein the index is written as at least one record to a data set of a buffer memory, wherein the buffer memory is flushed to the tape medium.

14. The system of claim 8, wherein the index is an incremental index only storing differences between updated write information on the tape medium and a previous index.

15. A computer program product comprising one or more computer readable storage media, and program instructions collectively stored on the one or more computer readable storage media, the program instructions comprising instructions configured to cause one or more processors to perform a method for reducing repositioning time within a tape system, the method comprising:
receiving a request to reposition to a target file within a tape medium;
determining that a previous command issued to the tape system was a write and that an index corresponding to the write has not been written;
writing, in response to determining that the previous command was the write and that the index corresponding to the write has not been written, a first file mark, the index after the first file mark, and a second file mark after the index.

16. The computer program product of claim 15, wherein the first file mark, the index after the first file mark, and the second file mark after the index are first written to a buffer memory and are thereafter flushed to the tape medium.

17. The computer program product of claim 16, wherein the method performed by the processor further comprises:
issuing, upon writing the first file mark, the index after the first file mark, and the second file mark after the index, the request to reposition to the target file within the tape medium.

18. The computer program product of claim 17, wherein the method performed by the one or more processors further comprises:
receiving a command to unmount the tape medium; and
repositioning directly to a beginning of the tape medium such that an unmount operation can be performed without repositioning to a write location of the index on the tape medium.

19. The computer program product of claim 15, wherein the index is written as at least one record to a data set of a buffer memory, wherein the buffer memory is flushed to the tape medium.

20. The computer program product of claim 15, wherein the index is an incremental index only storing differences between updated write information on the tape medium and a previous index.

* * * * *